(12) United States Patent
Gard et al.

(10) Patent No.: US 9,863,190 B2
(45) Date of Patent: Jan. 9, 2018

(54) ASSEMBLY FOR PRODUCING A GALLING-RESISTANT THREADED TUBULAR CONNECTION

(71) Applicants: VALLOUREC OIL AND GAS FRANCE, Aulnoye-Aymeries (FR); NIPPON STEEL & SUMITOMO METAL CORPORATION, Chiyoda-ku (JP)

(72) Inventors: Eric Gard, Genay (FR); Mohamed Gouider, Caluire-et-Cuire (FR); Mikael Petit, Villefranche sur Saône (FR)

(73) Assignees: VALLOUREC OIL AND GAS FRANCE, Aulnoye-Aymeries (FR); NIPPON STEEL & SUMITOMO METAL CORPORATION, Chiyoda-ku (JP)

( * ) Notice: Subject to any disclaimer, the term of this patent is extended or adjusted under 35 U.S.C. 154(b) by 426 days.

(21) Appl. No.: 14/648,565

(22) PCT Filed: Dec. 17, 2013

(86) PCT No.: PCT/EP2013/076841
§ 371 (c)(1),
(2) Date: May 29, 2015

(87) PCT Pub. No.: WO2014/095817
PCT Pub. Date: Jun. 26, 2014

(65) Prior Publication Data
US 2015/0315848 A1    Nov. 5, 2015

(30) Foreign Application Priority Data

Dec. 21, 2012    (FR) .................................... 12 62580

(51) Int. Cl.
*E21B 17/02* (2006.01)
*F16L 15/00* (2006.01)

(52) U.S. Cl.
CPC .............. *E21B 17/02* (2013.01); *F16L 15/00* (2013.01); *Y10T 403/5746* (2015.01)

(58) Field of Classification Search
CPC ..... E21B 17/02; F16L 15/00; Y10T 403/5746
See application file for complete search history.

(56) References Cited

U.S. PATENT DOCUMENTS

| 6,027,145 A | 2/2000 | Tsuru et al. |
| 2009/0033087 A1 | 2/2009 | Carcagno et al. |

(Continued)

FOREIGN PATENT DOCUMENTS

| CN | 101300443 A | 11/2008 |
| EP | 2 216 576 A1 | 8/2010 |

(Continued)

OTHER PUBLICATIONS

International Search Report dated Jan. 17, 2014, in PCT/EP2013/076841, filed Dec. 17, 2013.

*Primary Examiner* — Michael C Miggins
(74) *Attorney, Agent, or Firm* — Oblon, McClelland, Maier & Neustadt, L.L.P.

(57) ABSTRACT

The invention concerns an assembly for the production of a threaded connection, comprising a first and a second tubular component each with an axis of revolution (10) and each provided at one of their ends (1, 2) with a threaded zone (3; 4) produced on the outer or inner peripheral surface of the component depending on whether the threaded end is male or female in type, said ends (1, 2) being capable of cooperating by makeup and ending in a terminal surface (7, 8), at least one first contact surface being provided on one of the ends (1, 2) and at least one second contact surface being provided on the corresponding end (1, 2), such that the first (Continued)

and second contact surfaces come into contact during makeup of the ends (1, 2), characterized in that the first and second contact surfaces are respectively each coated with a first and a second dry thermoplastic film the matrices of which are constituted by one or more thermoplastic polymers, only one of the first and second dry thermoplastic films further comprising a liquid amorphous thermoplastic resin with a dynamic viscosity in the range 2000 to 40000 mPa·s at 25° C.

18 Claims, 5 Drawing Sheets

(56) References Cited

U.S. PATENT DOCUMENTS

| | | |
|---|---|---|
| 2009/0220780 A1 | 9/2009 | Bordet et al. |
| 2010/0301600 A1 | 12/2010 | Goto et al. |

FOREIGN PATENT DOCUMENTS

| | | |
|---|---|---|
| EP | 2 474 774 A1 | 7/2012 |
| JP | 2005-240888 A | 9/2005 |
| JP | 2005-256885 A | 9/2005 |
| WO | WO 2007042231 A2 | 4/2007 |
| WO | WO 2008/125740 A1 | 10/2008 |
| WO | WO 2009/057754 A1 | 5/2009 |
| WO | WO 2009/072486 A1 | 6/2009 |
| WO | WO 2010/043316 A1 | 4/2010 |
| WO | WO 2010/114168 A1 | 10/2010 |
| WO | WO 2012/049194 A1 | 4/2012 |
| WO | WO 2012/060472 A1 | 5/2012 |

ASSEMBLY FOR PRODUCING A GALLING-RESISTANT THREADED TUBULAR CONNECTION

The present invention relates to threaded connections for drilling and/or operating hydrocarbon wells, and more precisely to optimizing the overall performance of a connection in terms of galling resistance and gas seal by means of a synergistic association of solid thermoplastic coatings at least one of which comprises a liquid amorphous thermoplastic resin.

The term "threaded connections" means any assembly constituted by two elements with a substantially tubular shape that are capable of being assembled together by makeup, with a view in particular to constitute either a stem that can be used to drill a hydrocarbon well or a work over riser or a riser for operating a well of this type, or a casing or tubing string used in operating a well.

Each tubular component comprises an end portion provided with a male threaded zone or a female threaded zone intended to be made up with a corresponding end portion of an analogous element. Once connected in this manner, the elements compose what is termed a connection.

Such threaded tubular components of a connection are connected under defined loads in order to satisfy the requirements for an interference fit and seal imposed by the service conditions. Further, it should be known that the threaded tubular components may be required to undergo several makeup-breakout cycles, in particular when in service.

The conditions for use of such threaded tubular components give rise to different types of loads, which makes it necessary to use films on the sensitive portions of such components such as the threaded zones, abutting zones or sealing surfaces.

Thus, makeup operations are generally carried out under a high axial load, for example because of the weight of a tube several meters in length to be connected via the threaded connection, possibly aggravated by a slight misalignment of the axis of the threaded elements to be connected. This induces risks of poor shouldering of the abutments (poor pressurization of the sealing surfaces) and this induces the risk of galling at the threaded zones and/or at the metal/metal sealing surfaces. The threaded zones and the metal/metal sealing surfaces are therefore routinely coated with lubricants.

In current designs, it is necessary to select a coefficient of friction such that a torque on shoulder resistance value which is at least equal to a threshold value is obtained. In this manner, it is possible to avoid reducing the value of the optimum makeup torque defined for this type of connection and for the reference API grease and in extreme cases of avoiding no longer being able to guarantee the function of the abutment.

Some approaches have consisted of differentiating the coefficient of friction as a function of the loading zone by preferentially applying a PTFE bonded coating to the threadings (longitudinal movement loading zone) without coating the axial or abutment loading zone in order to locally generate a high coefficient of friction (see, for example, document US20090033087).

Other approaches have consisted of focussing on a shouldering torque of less than 70% of the value of the optimum clamping torque using essentially viscoplastic coatings (see, for example, the documents WO2008/125740, WO2009/072486). However, an essentially waxy thermoplastic coating runs the risk of plastification of the abutment before it reaches the optimum clamping torque, in particular for thin connections with small dimensions of the T&C (threaded and coupled) type or connections known as "high torque" connections.

For the skilled person, it is possible to increase the shear forces during the phase known as friction plastification of the makeup abutment (i.e. at the end of the tightening phase) by an elastic effect using thermoplastic materials with rheoresistant behaviour in a matrix with a solid consistency (see, for example, the document WO2010043316). However, the resistance to shear causes excessive heating, which has a tendency to modify the rheological viscoplastic properties of the matrix in the longitudinal movement loading zone and to affect the film effect which allows a large number of makeup/breakout operations.

In order to overcome the problem, the skilled person elected to adjust the elastic effect by surface migration or by impregnating a friction modifier into a solid thermoplastic matrix with a high softening point with the aim of reducing the value of the shouldering torque without affecting the torque on shoulder resistance as a function of the loading zone and of providing a resistance to galling, even in the case of a rupture of the film beyond a loading ceiling (see, for example, the documents WO2010114168 and WO2012049194). Although the effect occurs in the initial zone and at the end of tightening, the lubricant film is easily extruded in an abundance of flakes due to a combination of factors attributed to the choice of thermoplastic polymers which constitute the matrix. The softening point or melting point is preferably in the range 80° C. to 320° C. and is much higher than a temperature corresponding to those to which the constituents are exposed during storage or use in order to prevent the polymers from picking up dust and other contaminants due to their tacky nature. In addition, polymers such as a copolyamide of acid dimers which have a rubber-like thermodynamic behaviour make the matrix highly cohesive, opposing the force of adhesion.

Alternatively, patent document WO2009057754 and more recently patent document WO2012060472 have proposed the production of a thin layer of a lubricating film with a pasty or waxy consistency (known as a "semi-dry" film) comprising materials which provide a resistance to friction which depends on the contact pressure. These solutions use a rosin derivative or "tackifying" solid resin with a softening point in the range 60° C. to 200° C. or a calcium fluoride, for example. The braking principle is, however, greatly limited, attributed to the fact that the highly viscous matrix contributes to limiting sliding at the metal-metal interface and as a result, increases the friction. In addition, the thin film is not in the solid state, which is a disadvantage during transport, storage and use (risk of contamination).

Based on this observation, the present invention is based on a synergistic effect of the required properties, by applying two solid thermoplastic coatings having a differential coefficient of friction and thermodynamic behaviour facing each other and irrespectively of whether it is on the male or female end of the connection. The present invention thus proposes obtaining a torque on shoulder resistance which is 100% or more of the reference value of API 5A3 grease, conserving the lubricant film for as long as possible between the surfaces in contact in order to ensure optimal lubrication performance.

In particular, the present invention pertains to an assembly for the production of a threaded connection, comprising a first and a second tubular component each with an axis of revolution and each provided at one of their ends with a threaded zone produced on the outer or inner peripheral surface of the component depending on whether the threaded end is male or female in type, said ends being capable of cooperating by makeup and ending in a terminal surface, at least one first contact surface being provided on one of the ends and at least one second contact surface being provided on the corresponding end, such that the first and second contact surfaces come into contact during makeup of the ends, characterized in that the first and second contact surfaces may respectively each be coated with a first and a second dry thermoplastic film the matrices of which may be constituted by one or more thermoplastic polymers, only one of the first and second dry thermoplastic films further comprising a liquid amorphous thermoplastic resin with a dynamic viscosity in the range 2000 to 40000 mPa·s at 25° C.

Optional, complementary or substitutional characteristics are set out below.

The first and second contact surfaces may be a portion of the threaded zones.

The first and second contact surfaces may be sealing surfaces provided on the circumferential surface of the ends of the first and second tubular components.

The first and second contact surfaces may be abutment surfaces provided on the terminal surfaces of said ends.

The thermoplastic polymer or polymers constituting the matrix of the first and second dry films may have a semi-crystalline structure and a melting point in the range 60° C. to 170° C.

The thermoplastic polymer or polymers may be selected from the list defined by copolymeric resins containing ethylene-vinyl acetate copolymers, ethylene-ethyl acrylate copolymers, ethylene-methyl acrylate copolymers, copolymers with alternating blocks of an amorphous butyl acrylate polymer between two crystalline polymethylmethacrylate polymers and copolyamides based on dimers obtained from a polycondensation reaction between a diacid and a diamine.

The thermoplastic polymer or polymers may be an ethylene-vinyl acetate copolymer with a proportion of vinyl acetate in the range 18% to 40%, preferably equal to 28%.

The ratio of the concentrations of the liquid amorphous thermoplastic resin to the polymers may be in the range 1.5 to 2.

The liquid amorphous thermoplastic resin may be selected from the list defined by rosin acid derivatives esterified with methanol or with triethylene glycol, aromatic hydrocarbon resins with a molecular mass of less than 500 g/mole, hydroxylated polyester resins, polyisobutylenes and polyalkylmethacrylates.

The thermoplastic dry films may also comprise one or more waxes selected from the list defined by paraffins, microcrystalline waxes, carnauba waxes, polyethylene waxes, amide waxes and hydrogenated castor oils.

The proportion by weight of waxes in the thermoplastic dry film may be in the range 3% to 20%.

The dry thermoplastic films may also comprise particles of solid lubricants selected from the list defined by graphite, boron nitride, zinc oxide, molybdenum disulphide, graphite fluoride, tin sulphides, bismuth sulphides, thiosulfates, polytetrafluorethylene and polyamides.

The proportion by weight of solid lubricant particles in the dry thermoplastic film may be in the range 2% to 20%.

The dry thermoplastic films may also comprise a complex alkylarylsulphonic acid salt neutralized with a calcium carbonate, the proportion by weight remaining below 40%.

The dry thermoplastic films may also comprise a corrosion inhibitor, preferably calcium ion-exchanged silica, the proportion by weight of corrosion inhibitor being in the range 5% to 15% by weight.

The dry thermoplastic films may also comprise a polydimethylsiloxane or perfluoropolyether oil, said oil having a kinematic viscosity in the range 100 to 1850 mm$^2$/s at 20° C., the proportion by weight of said oil being in the range 2% to 10%.

The first and second contact surfaces may already have been treated by means of a surface preparation step selected from the group constituted by sand blasting, conversion treatments and electrolytic deposition, before coating each surface with a dry thermoplastic film.

Features and advantages of the invention will be described in more detail in the description which follows, made with reference to the accompanying drawings in which.

Figure 1:
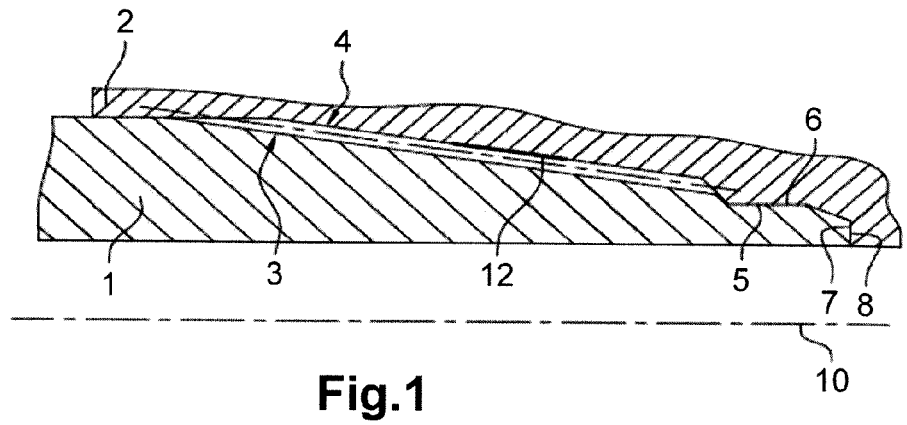
FIG. 1 is a diagrammatic view of a connection resulting from connecting two tubular components by makeup.

The invention is of application to threaded connections of the type shown in FIG. 1. This type of connection comprises a first tubular component with an axis of revolution 10 provided with a male end portion 1 and a second tubular component with an axis of revolution 10 provided with a female end portion 2. The end portions 1 and 2 each have a terminal surface which is disposed perpendicular to their respective axis of revolution 10 and are respectively provided with a threaded zone 3 and 4 which cooperate mutually for mutual connection of the two components by makeup. The threaded zones 3 and 4 may be of the trapezoidal, self-locking, or other thread type. Furthermore, metal/metal sealing surfaces 5, 6 intended to come into sealed interfering contact against each other after connecting the two threaded components by makeup are provided respectively on the male 1 and female 2 end portions close to the threaded zones 3, 4. The male end portion 1 has a terminal surface 7 which can come into abutment against a corresponding surface 8 provided on the female end portion 2 when the two components are made up one into the other. The connection also comprises two sealing surfaces 5 and 6 respectively disposed on the end portions 1 and 2 and intended to come into sealed clamping contact when the connection is made up.

Depending on the type of coupling or connection, the abutment between the terminal surface 7 and the corresponding surface 8 may also be replaced by self-locking interfering cooperation of the threaded zones 3, 4 of the type described, for example, in U.S. Pat. No. 4,822,081, U.S. RE 30 467 or U.S. RE 34467.

Depending on the design or use requirements, the end portions 1 and 2 of the tubular components may be partially or completely coated. As an example, the threaded zones 3 and 4 may be partially or wholly coated. This is also the case for the sealing surfaces 5 and 6 and for the abutment surfaces when they are provided at the end surface 7, and of the corresponding surface 8.

We shall now discuss the genesis and details of the invention.

The overall performance of a threaded tubular system consists of preventing adhesive wear by providing sufficient separation of the surfaces in contact by means of sufficient lubricant and of guaranteeing the seal to gas of the connection in the abutment zone.

Figure 2:
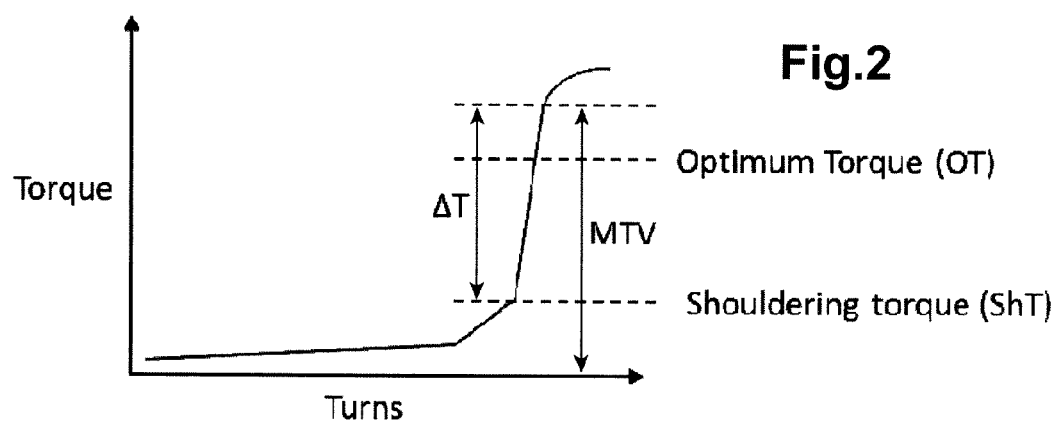
FIG. 2 is a diagrammatic view of a makeup curve for two threaded tubular components.

FIG. 2 shows a makeup curve for a connection, namely the increase in torque as a function of the number of turns and of the increasing pressure in the contact zone. As can be seen, a makeup torque profile for "premium" connections can be broken down into four portions.

At the start of makeup, the slope is small because the outer threads of the male threaded element (or "pin") of a first component of a threaded tubular connection are not yet in radial interference contact with the inner threads of a corresponding female threaded element (or "box") of a second component of this same threaded tubular connection.

Next, geometrical interference of the threads of the male and female threaded elements generates an increasing radial interference as makeup is continued (generating a small but increasing makeup torque thereby).

Next, the slope of the curve increases, which corresponds to the appearance of radial interference between the sealing surfaces or even between the threads. This portion ends when the shouldering torque, ShT, is reached.

The final portion ends when the abutment surfaces are in axial abutment and when the maximum admissible makeup torque, MTV, is reached.

The maximum makeup torque MTV, which corresponds to the end of the final portion, is known as the plastification torque. Beyond this plastification torque, the male makeup abutment (end portion of the male threaded element) and/or the female makeup abutment (zone located behind the annular abutment surface of the female threaded element) is/are assumed to have been subjected to plastic deformation, which might degrade the performance of the sealing contact between the sealing surfaces by plastification of the sealing surfaces as well.

The difference between the values for the plastification torque MTV and the shouldering torque ShT is known as the torque on shoulder resistance. A threaded tubular connection is subjected to optimal tightening at the end of makeup, which guarantees optimal mechanical strength of the threaded connection, for example against tensile forces, but also against accidental breakout in service, and also to optimal sealing performances.

Good performance is characterized first of all by a shouldering torque (ShT) which satisfies the following inequality:

$$ShT < 0.56 \, MTV \quad (3)$$

where MTV: maximum admissible torque.
The inequality (3) is related by the following inequalities:

$$ShT < 0.70 \, OT \quad (1)$$

$$OT < 0.80 \, MTV \quad (2)$$

where OT: optimum torque.
This performance is also characterized by a large torque on shoulder resistance ($\Delta T$) which generates sufficient energy at the unthreaded metal contact portion. Satisfying inequalities (1) and (2) guarantees a great deal of flexibility in determining the optimum makeup torque as a function of the dimension and grade of connection. If at least one of the inequalities is not satisfied, two major risks of weakening the performance of the connection arise:
- the risk of plastically deforming a portion of the abutment before having finished makeup in the case in which the torque on shoulder resistance is insufficient and the makeup torque is high;
- the risk of not shouldering at the unthreaded metal contact portion and of having incomplete makeup in the case in which the shouldering torque does not satisfy at least one of the equations (1) to (3).

Currently, the greases used for connections, including heavy-metal free greases, satisfy this requirement and offer excellent performances irrespective of the dimensions and the grade of the connection. More precisely, oil-based greases, complex thickeners and lubricating or metallic solids combine two antagonistic but complementary rheological properties: a flow behaviour with low friction in the hydrodynamic phase, and a "piezoviscous" behaviour in the lubrication phase under high pressure. The piezoviscosity corresponds to an increase in the viscosity of the base oil under pressure. More particularly, this property is useful in lubricating mechanical systems wherein the variation of the viscosity of the oil dictates its proper operation. Devices for varying the speed, as is the case during makeup, require piezoviscous oils because of the difficulty of transmitting a torque between metallic parts which are not in contact and are subjected to high pressures.

Other explanations have also been put forward, in particular in the case of API greases, indicating that metals such as lead and copper generate a high resistance to friction by crushing when the contact pressures increase.

In the case of solid coatings, this antagonism may be overcome by adjusting the coefficient of friction by means of a plurality of solid coatings applied in different manners as a function of the makeup zone in order to carry out the various functions of lubrication, galling resistance and sealing, and primarily constituted by solid lubricants in a sacrificial heat-curable binder. The solid lubricants also generate coefficients of friction in the range 0.02 to 0.12 depending on the chemical nature and the crystalline structure. The uncoated unthreaded metal contact portion thus just receives a surface preparation or a chemical conversion such as zinc phosphatation in order to artificially increase the value of the high pressure friction.

Other successive approaches to solid thermoplastic coatings have contributed to restoring low friction at high speeds and low contact pressures in the threading (150-500 MPa), preserving a torque on shoulder resistance which is greater than or equal to the reference value for the API5A3 grease. To this end, a single coating is applied to either the threading or the sealing abutment and comprises a rheo-resistant material such as a "tackifying" solid resin with a softening point in the range 60° C. to 200° C. or a copolyamide resin in combination with a silicone or perfluorinated lubricating oil in a primarily viscoplastic matrix. During formation of a lubricating film, surface migration of lubricating oil compensates for the increase in the coefficient of friction resulting from resistance to movement under high pressure during makeup.

However, investigation of a high torque on shoulder resistance is limited by mechanical elements linked to free volume, to interference between the two surfaces in contact, to machining tolerances, to the geometry of the connection and in particular to the thickness and to the surface of the area in contact in the unthreaded metal contact portion. The rheo-resistance approach by means of materials with a natural resistance to movement has in some cases provided evidence of limits in the capacity of the lubricating film to re-agglomerate, namely to flow in the loading region and to maintain the third substance in the contact for as long a time as possible. One consequence resides in the formation of extrudates and flakes obtained from the highly elastic behaviour or even elastomeric behaviour of a lubricating film. The extrudates and flakes are deleterious because they risk polluting the wells, in particular in the case of drilled wells operated in the North Sea and subject to the OSPAR convention (1998). The high resistance to movement of thermoplastic materials (polymers or resins) with a primarily amorphous structure is the result of a high elastic modulus under shear/compressive load and/or vitreous behaviour in the load/temperature domain associated with many secondary inter-molecular interactions (hydrophobic bonds, Van der Waals bonds, hydrogen bonds, polar bonds) which reinforce cohesion rather than adhesion to surfaces.

It follows that in certain cases, the inequality (1) is not satisfied despite obtaining a large torque on shoulder resistance.

In order to increase the capacity of the lubricating film to shear and flow in the temperature and load domain, it is possible to use crystalline waxes or crystalline metallic soaps with viscoplastic, ductile behaviour. However, there is a high risk of reducing the shear load, including under high pressures, and as a result of reducing the torque window which can be used to determine the optimum makeup torque between high and low interferences of the connection.

Thus, it is preferable to use a liquid amorphous thermoplastic resin which is sufficiently viscous to preserve the torque reserve by means of a supplemental piezoviscous effect under high load and which is sufficiently adhesive and tacky to ensure re-agglomeration of debris from the lubricant film which is formed.

In order to overcome the problems of solid thermoplastic coatings, the present invention proposes forming a third substance which can correct the antagonism and is capable of both widening the makeup torque window and prolonging the life of the connection.

Figure 3:
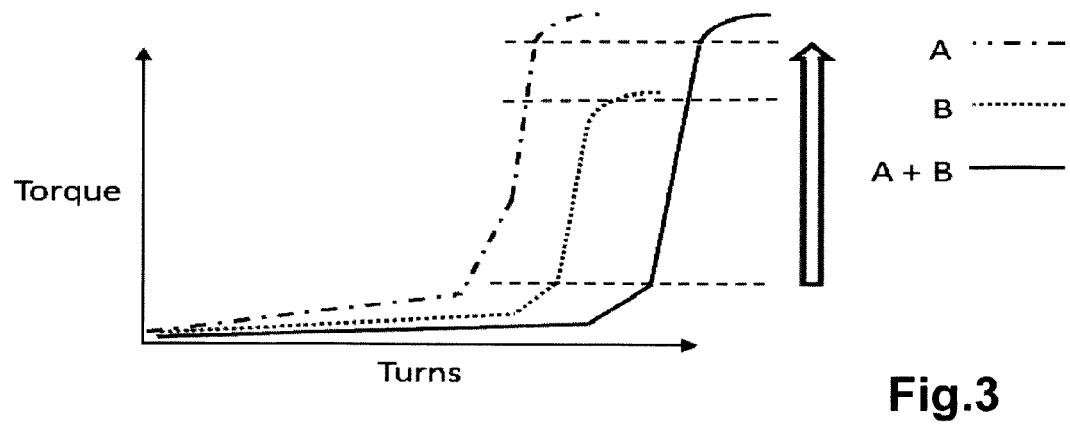
FIGS. 3 to 7 represent test result curves.

The innovation consists of associating two solid thermoplastic coatings with synergistic performances at least one of which comprises a liquid amorphous thermoplastic resin with a dynamic viscosity in the range 2000 to 40000 mPa·s at 25° C. FIG. 3 shows that if a product A applied to the male portion and to the female portion provides a low shouldering torque ShT and a low plastification torque MTV, and a product B applied to the male portion and to the female portion provides a high shouldering torque ShT and a high plastification torque MTV, then a connection coated with a product A on one side and B on the other can obtain a surprising result, namely a low shouldering torque ShT and a high plastification torque MTV.

In order to prevent galling on each makeup and in order to guarantee a seal of the connection, a lubricating film must be maintained for as long as possible between the surfaces in contact. The lubricating film must also guarantee a comfortable reserve of torque in order to facilitate determination of the optimum makeup torque irrespective of the grade of the connection (weight, diameter) and irrespective of the interference type.

The present invention proposes applying to each of the zones of the connection which are to be brought into contact a coating with a matrix constituted by one more thermoplastic polymers which is solid and dry (i.e. not tacky to the touch), flexible, adhesive under load, rheo-resistant under high pressure and which demonstrates good lubricating properties.

On just one of the two zones of the connection which are to be brought into contact, the solid thermoplastic coating also comprises a liquid amorphous thermoplastic resin with a dynamic viscosity in the range 2000 to 40000 mPa·s at 25° C.

The thermoplastic coating, supplemented with the liquid amorphous thermoplastic resin, may also comprise solid lubricants in order to improve the lubrication properties and waxes in order to adjust the shear loading and the thermomechanical properties.

The thermoplastic polymer advantageously has a semi-crystalline structure and a melting point or softening point in the range 60° C. to 170° C. If the melting point of the thermoplastic polymer is too high, it becomes difficult to apply the coating in its molten state, as is the case for coatings involving a process known as "hot melt". If the melting point is too low, the solid lubricant film softens when it is exposed to high temperatures such as in tropical regions or in summer in temperate regions, which may result in degradation of performance.

In particular, the thermoplastic polymers which may be used are copolymer resins containing polar groups such as ethylene-vinyl acetate copolymers, ethylene-ethyl acrylate copolymers, ethylene-methyl acrylate copolymers, and also copolymers with alternating blocks of an amorphous butyl acrylate polymer between two crystalline polymethylmethacrylate polymers, and where the proportion of amorphous polymer is more than 70%.

The semi-crystalline thermoplastic polymers may also be copolyamides based on dimers (hot melt polyamide) obtained from a polycondensation reaction between a diacid (adipic acid, sebacic acid, dodecanoic acid, terephthalic acid) and a diamine (ethylenediamine, hexamethylenediamine, piperazine, polyoxyalkylenediamine, aromatic amines, dimerdiamine, branched diamines). The copolyamides are selected for their capacity to adhere by mechanical anchoring in the porous supports and principally by its amide functions onto polar supports. The dimer-based copolyamides are also selected for their "rheo-resistance" property. The dimer-based copolyamides have a glass transition temperature in the range −55° C. to 25° C., preferably less than −20° C., endowing them with a rubber-like behaviour in the load and temperature range which is representative of makeup. The thermoplastic matrix may comprise just one or a mixture of dimer-based copolyamides in a concentration in the range 20% to 70% of the mass of the lubricating film.

In order to be supple and flexible, the thermoplastic copolymer will have a tensile strength of less than 10 MPa, an elongation at break in the range 10% to 1100%, preferably an elongation at break of less than 600%. The thermoplastic copolymer, preferably an ethylene-vinyl acetate copolymer, will have a proportion of vinyl acetate in the range 18% to 40%. A small proportion of vinyl acetate improves compatibility with the other constituents of the matrix, in particular the waxes. A high proportion of vinyl acetate increases solubility, improves flexibility and the strength of the film. An ethylene-vinyl acetate copolymer with a proportion of vinyl acetate of 28% is preferred.

So that the thermoplastic matrix can be adhesive under load, the semi-crystalline thermoplastic copolymer is generally compatibilized with a solid "tackifying" resin. The "tackifying" resin provides tack and viscosity above the softening temperature. The mixture will provide sufficient tack if the elastic modulus G' is less than $10^7$ Pa in the loading and temperature region and too much if the modulus is less than $10^6$ Pa, as is the case with a pressure sensitive adhesive (PSA), which would risk affecting the capacity of the film not to pick up dust and pollutants. In other cases, it will be possible to select a thermoplastic polymer the adhesion mechanism of which is due to mechanical anchoring.

The "tackifying" solid resin has a softening point in the range 60° C. to 200° C., preferably higher than that of a thermoplastic polymer, in order to increase the elastic modulus, the viscosity or the rigidity of the mixture as a function of the temperature range, and as a consequence the coefficient of friction. After having mixed the resin into the molten polymer, the resin becomes interposed, increases the intermolecular interactions and disorganizes the crystalline structure of the polymer. The ratio between the polymer and the resin is preferably in the range 20/80 to 40/60 and the fraction of the amorphous structure in the thermoplastic matrix is more than 50% in order to adjust the "rheo-resistance" property. As the fraction of amorphous structure in a thermoplastic material or mixture is increased, "rheo-resistance", measured with respect to the value for a reference API5A3 grease using a Bridgman test, increases near-asymptotically.

In particular, the solid "tackifying" resins which may be used are resin acid or rosin acid derivatives esterified with glycerine, pentaerythritol or polymerized rosin acid, or terpene, polyterpene or phenolic terpene resins, terpene styrene resins. Incidentally, aliphatic and/or aromatic hydrocarbon resins may be used because their highly hydrophobic nature provides excellent moisture resistance and reduces the water vapour permeability.

In order to adjust the rheological properties to the application, it is preferable to form a mixture of thermoplastic polymers, solid "tackifying" resin and waxes with different melting points or softening points in a wide range of temperatures. A wax does not only have an effect on preventing galling by reducing the shear load, and as a result the coefficient of friction, but it also contributes to increasing the fluidity of the matrix in the molten state and of reducing the tack of the coating which is formed. The waxes may be of mineral (paraffin or micro-crystalline waxes), vegetable (carnauba wax) or synthetic origin (polyethylene waxes, amide waxes or hydrogenated castor oil waxes). A mixture of a micro-crystalline wax with a high penetrability and a hydrogenated castor oil is preferable in order to increase the adhesion and ductility of the matrix. A proportion of waxes of more than 20% by weight in the coating could drastically reduce the "rheo-resistance". A minimum of 3% by weight of wax is necessary in order to observe the effects described above.

In order to increase the lubrication properties, the thermoplastic matrix may additionally contain different solid lubricating particles. The term "solid lubricant" as used here means a solid, stable substance which, on being interposed between two frictional surfaces, can reduce the coefficient of friction and reduce wear and damage to the surfaces. These substances can be classified into different categories defined by their functional mechanism and their structure, namely:

class 1: solid substances owing their lubricating properties to their crystalline structure, for example graphite, boron nitride or zinc oxide;

class 2: solid bodies owing their lubricating properties to their crystalline structure and also to a reactive chemical element in their composition, for example molybdenum disulphide $MoS_2$, graphite fluoride, tin sulphides or bismuth sulphides;

class 3: solid substances owing their lubricating properties to their chemical reactivity, for example certain chemical compounds of the thiosulphate type;

class 4: solid substances owing their lubricating properties to a plastic or viscoplastic behaviour under frictional load, for example polytetrafluoroethylene (PTFE) or polyamides.

Each of the classes of solid lubricants may be used; in particular, at least one lamellar film-effect lubricating solid from class 1 may be used, so that it does not interfere with the other properties. However, it is preferable to use a combination of several solid lubricants of a different class in order to increase the property as a function of the nature of the surface. On a carbon steel coated with an electrolytic deposit of a Cu—Sn—Zn alloy, it would be preferable to use a combination of a solid lubricant from class 2 with a sulphur chemical element for chemical absorption and a lubricating solid from class 4 in order to adjust the plastic behaviour under frictional load. The proportion of solid lubricated particles in the lubricating film is in the range 2% to 20% by weight.

In order to improve the ductility, the anti-galling and protective effect against corrosion, it is possible to add a complex salt of an aromatic organic acid, preferably an alkylarylsulphonic acid neutralized with a calcium carbonate dispersed as colloidal micro-particles in an oil. The alkali metal or alkaline-earth metal salt is in excess so that the alkalinity is in the range 250 to 450 mgKOH/g. At ambient temperature, this substance generates a film which is both hydrophobic for a protective barrier effect against the corrosion mechanism, and lubricating on the one hand by physical absorption of the excess metallic salt and on the other hand by a chemical absorption of the organic acid function onto the metal surface. The concentration of complex aromatic organic acid salt does not exceed 40% by weight of the thermoplastic matrix. The lubricating film becomes semi-solid if the concentration is more than 40% by weight of the thermoplastic matrix.

In order to reinforce the barrier effect and the anticorrosion property, the thermoplastic matrix may contain a corrosion inhibitor such as calcium ion-exchanged silica. The concentration of calcium-exchanged silica in the lubricating film is in the range 5% to 15% by weight.

In order in particular, to avoid the phenomenon of "high shouldering", it is preferable to significantly reduce the coefficient of friction for low frictional loads (150-500 MPa) generated by the interferences of the threads and the surface at the moment of shouldering. In order to reduce the coefficient of friction, it is preferable to use a friction modifier which is not compatible with the other substances of the matrix in order to facilitate surface migration and not to affect the value of the "rheo-resistance". The friction modifiers which may be used are oils with a low coefficient of friction (polydimethylsiloxane or perfluoropolyether) with a kinematic viscosity in the range 100 to 1850 $mm^2/s$ at 20° C. The proportion of polydimethylsiloxane oil is in the range 2% to 10% by weight in the coating.

Finally, the solid thermoplastic coating may contain up to 2% by weight of other additives such as wetting agents, dispersing agents, dyes or, in particular, antioxidants in order to aid thermal stability of the polymers and thermoplastic resins in an oxidizing medium.

The Applicant has demonstrated the performances of the association of two solid thermoplastic coatings at least one of which comprises a liquid amorphous thermoplastic resin, in accordance with the invention. To this end, the Applicant carried out comparative tests between conventional coatings and coatings in accordance with the invention, these tests being aimed on the one hand at evaluating the makeup torques using a Bridgman test and on the other hand at evaluating the coefficients of friction by means of a Scratch test.

Figure 10:
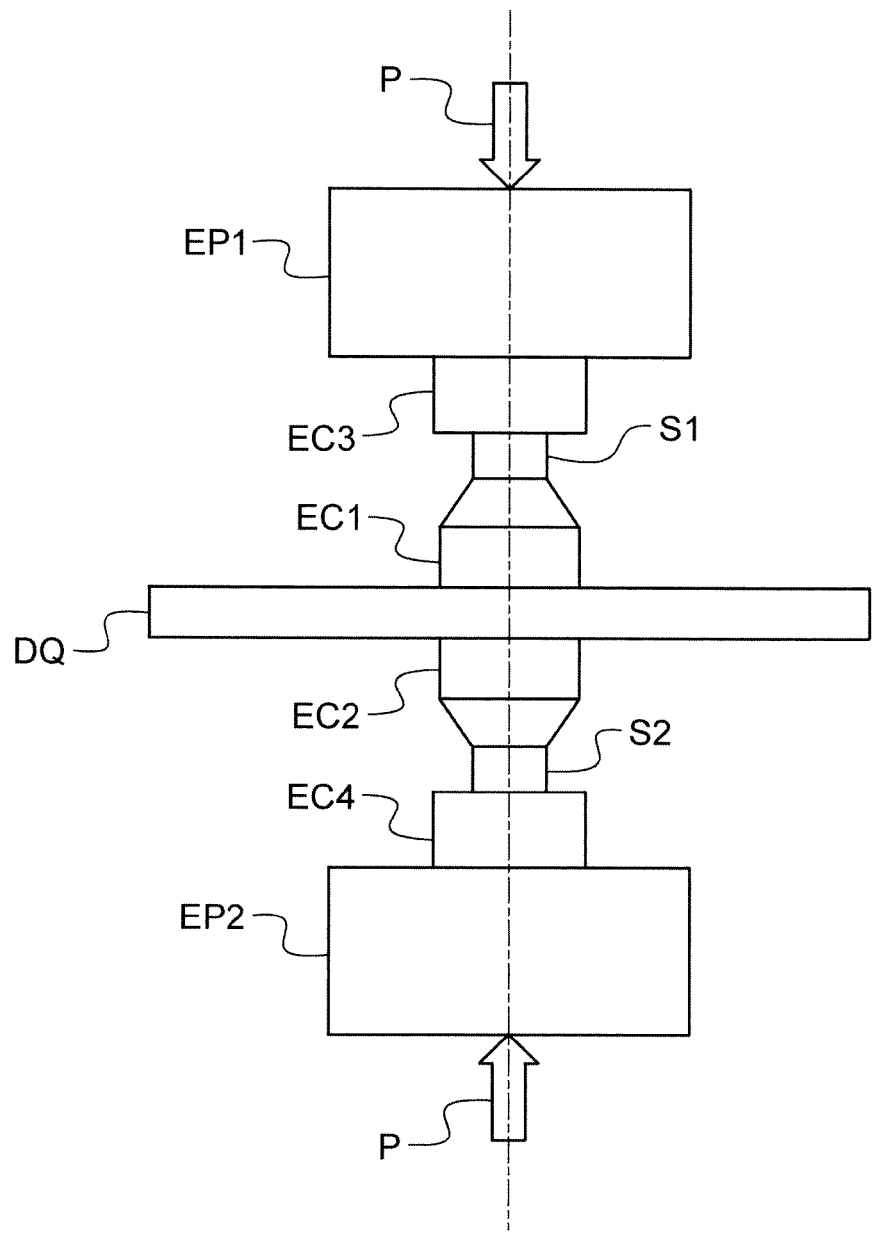
FIG. 10 is a diagrammatic view of a test set-up.

The modified Bridgman tribometer can be used to evaluate the torque and the friction of surfaces in contact under high Hertz pressures. The Bridgman test device has in particular been described in the article by D Kuhlmann-Wilsdorf and al, "Plastic flow between Bridgman anvils under high pressures", J. Mater. Res., vol 6, no 12, December 1991. A diagrammatic and functional example of a Bridgman machine is illustrated in FIG. 10. This machine comprises:
- a disk DQ which can be driven in rotation at selected speeds;
- a first anvil EC1, preferably conical in type, permanently attached to a first face of the disk DQ;
- a second anvil EC2, preferably conical in type, permanently attached to a second face of the disk DQ, opposite its first face;
- first EP1 and second EP2 pressure elements, such as pistons, for example, which can exert the selected axial pressures P;
- a third anvil EC3, preferably cylindrical in type, which is permanently attached to one face of the first pressure element EP1;
- a fourth anvil EC4, preferably cylindrical in type, which is permanently attached to one face of the second pressure element EP2.

To test a lubricating composition, two pieces of a material identical to that constituting a threaded element are covered with said composition in order to form the first S1 and second S2 specimens. Next, the first specimen S1 is interposed between the free faces of the first EC1 and third EC3 anvils, and the second specimen S2 between the free faces of the second EC2 and fourth EC4 anvils. Next, the disk DQ is rotated at a selected speed while applying a selected axial pressure P (for example of the order of 1.5 GPa) with each of the first EP1 and second EP2 pressure elements, and the makeup torque to which each specimen S1, S2 is subjected is measured. The axial pressure, the rotational speed and the angle of rotation are selected in the Bridgman test in order to simulate the Hertz pressure and the relative speed of the abutment surfaces at the end of makeup. Using such a machine, it is possible to fix several different pairings of parameters (makeup torque, rotation speed) in order to impose predetermined makeup torques on specimens S1 and S2, and thus to check whether these specimens S1 and S2 closely follow a given makeup torque profile, and in particular whether they can reach a number of completed turns before galling which is at least equal to a threshold value selected with respect to the selected makeup torques.

In the present case, the selected contact pressure was raised to 1 GPa and the rotational speed was raised to 1 rpm. The test specimens were formed from carbon steel, machined then coated with different dry film formulations.

Figure 8:
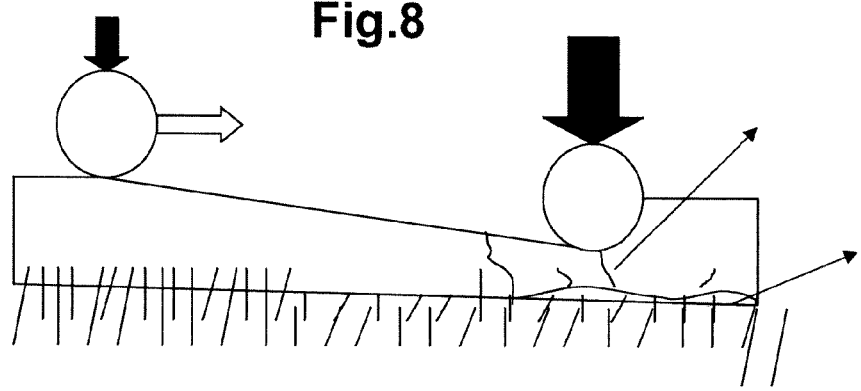
FIG. 8 is a diagrammatic view of a test set-up.

The Scratch test device, shown diagrammatically in FIG. 8, allows the adhesive force or adhesion of a film on a surface or surface preparation to be determined. This method, consisting of shearing and deforming a film with a spherical bead subjected to an increasing load, also allows two tribological parameters which are important to the wear resistance to be determined, namely the coefficient of friction and the critical load corresponding to the appearance of a loss of film cohesion.

The experimental conditions employ a spherical bead formed from tungsten carbide with a diameter of 5 mm and a metal specimen formed from XC or Z20C13 carbon steel with a roughness Ra of less than 1 micrometer, with optional surface preparation which may respectively be sand blasting, zinc or manganese phosphatation, and a ternary Cu—Sn—Zn electrolytical deposit. The parameters of the operating mode include a load increasing from 10 N to 310 N (with a load increase rate of 15 N/s), a rate of displacement of the bead of 2 mm/s, a duration of 20 s and a track length of 40 mm.

Figure 4:
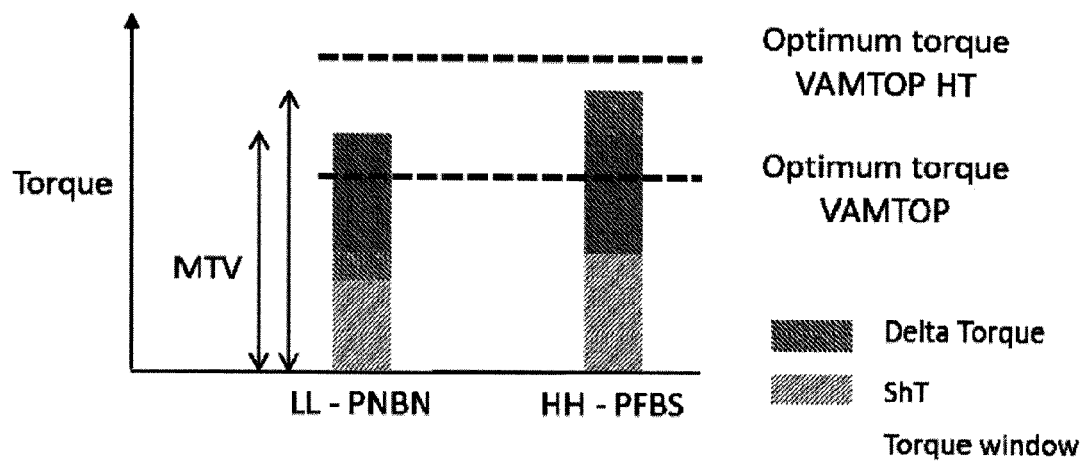

Tests were carried out on a solid thermoplastic coating comprising a thermoplastic matrix constituted by an ethylene-vinyl acetate copolymer, a rosin acid esterified with glycerine with a softening point in the range 60° C. to 200° C., waxes and a polydimethylsiloxane oil. This latter demonstrated a coefficient of friction of 0.07 to 0.08 under low pressure loads (approximately 200 MPa) and a "rheo-resistance" value in the range 90% to 100% of the value of the value of a API5A3 reference grease. In the case of makeup of a 7" 29# CS L80 VAM TOP HC connection where the solid thermoplastic coating is applied symmetrically to the male and female portion, the rheo-tribological properties of said coating mean that the makeup rules can be adhered to, namely a shouldering torque 70% below the optimum makeup torque defined for the connection and less than 56% of the maximum makeup torque but the absolute value of the maximum makeup torque, determined irrespective of machining interferences (LL-PNBN or HH-PFBS) remain below the makeup torque of the "High Torque" VAM TOP reference connection for the same dimension ("liner max" makeup torque defined in the VAM Running Book), as can be seen in FIG. 4. FIG. 4 diagrammatically shows, as a histogram, values for the vertical overtorque makeup torque with a weight of 420 kg.

Comparatively, a solid thermoplastic coating comprising a thermoplastic matrix primarily constituted by copolyamides based on dimers, an amide wax and a polydimethylsiloxane oil had a coefficient of friction of 0.12 under the same conditions as before, and a "rheo-resistance" value of more than 105% of the value for a API5A3 reference grease. In the case of makeup of a 7" 23# CS L80 VAM21 connection where the solid thermoplastic coating is applied to the female portion and a protective epoxy-acrylic resin as described in document WO2010140703 is applied to the male portion, the good rheo-tribological properties of said coating could not satisfy the makeup rules with an optimum makeup torque of 17700 N.m. The lubricant film was particularly viscoelastic under frictional load, which affected the torque reserve, as is shown both by the increase in the shouldering torque and the reduction in the torque on shoulder resistance for increasing machining interferences. This high viscoelasticity does not allow the lubricating film to flow and adhere in the load zone. The lubricating film is extruded from the contact, allowing unprotected metal to appear in a limiting lubrication phase. Galling rapidly occurs after 5 successive makeup/breakout operations.

In order to evaluate the improvement in the overall performances of the coated connection, in one embodiment of the invention, a thermoplastic coating comprising a liquid amorphous thermoplastic resin is applied to the other portion of the connection.

In accordance with the invention, a liquid amorphous thermoplastic resin in a thermoplastic matrix provided with a property of "rheo-resistance" can be used to adapt the thermomechanical properties in order to increase the capacity of the lubricating film to shear and flow in the load/temperature zone.

In the present case, the thermomechanical properties were determined by compression/shear thermodynamic analysis (DMTA) using a "TTDMA T101423" apparatus supplied by Triton Technologie. The temperature was increased from −100° C. to 100° C. at 2° C./min; the strain frequency was 1 Hz and the deformation was imposed in the linear region.

Figure 5:
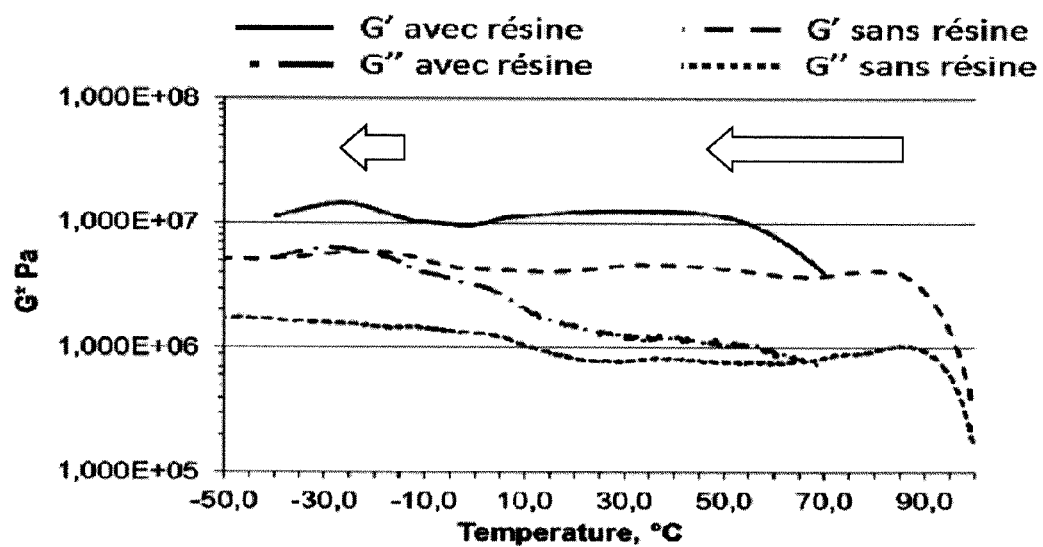

FIG. 5 shows the change, in shear mode, of the elastic modulus (G') and the viscous modulus (G") of a lubricating film comprising a thermoplastic polymer of the copolyamide type based on dimers with and without liquid amorphous thermoplastic resin. The elastic modulus (or conservation modulus) is expressed in Pa and represents the real portion of the complex modulus M*. The viscous modulus (or loss modulus) represents the imaginary portion of the complex modulus M*.

The variation in the elastic modulus G' of a material comprising a liquid amorphous thermoplastic resin results in a shift in the softening point and the pour point to lower temperatures. The increase in the viscous modulus G" results in a greater dissipation of energy in the form of heat during shear which is characteristic of an increase in its "rheo-resistance" by a softening effect.

In addition, the "rheo-resistance" property is confirmed by a measurement 130% higher than the value of an API5A3 reference grease determined using the Bridgman test.

Figure 6:
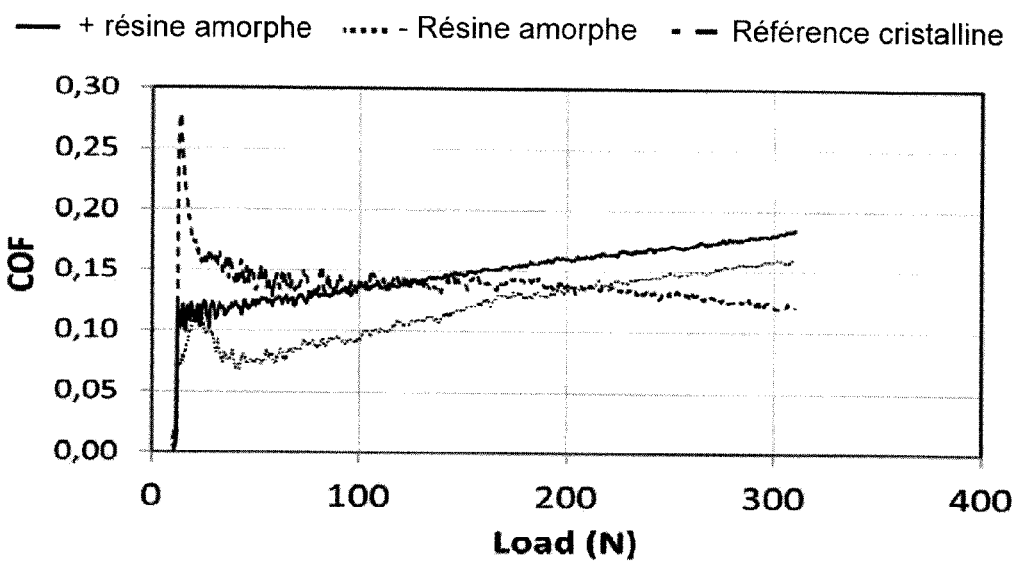

At the same time, the variation in the coefficient of friction as a function of the increasing load measured using the Scratch test in FIG. 6 indicates that the value of the coefficient of friction generally increases with the load when the lubricating film is "rheo-resistant". Conversely, a reference thermoplastic coating which is completely crystalline (described in patent WO2009072486) is characterized by a stable or even decreasing coefficient of friction. FIG. 6 represents the change in the coefficient of friction as a function of increasing load.

The liquid amorphous thermoplastic resins which may be used are derivatives of rosin acid esterified with methanol or triethylene glycol, aromatic hydrocarbon resins with a molecular mass of less than 500 g/mole, hydroxylated polyester resins, polyisobutylenes or polyalkylmethacrylates. The liquid resin must have a dynamic viscosity in the range 2000 to 40000 mPa·s at 25° C. (measured with a Brookfield viscosimeter). A dynamic viscosity of more than 40000 mPa·s at 25° C. exhibits no improvement in the thermomechanical properties. The liquid amorphous thermoplastic resin must have a glass transition temperature of less than −10° C., preferably less than −20° C. The concentration of the liquid amorphous thermoplastic resin in the thermoplastic matrix is in the range 40% to 60%. Preferably again, the concentration ratio of the liquid resin to the polymer is in the range 1.5 to 2. A ratio of less than 1.5 reduces adhesion, while a ratio of more than 2 accentuates the capture of dust and pollutants (for example sand) by the film formed for a storage temperature of more than 50° C.

In the case of makeup of a 7" 23# CS L80 VAM 21 connection in which the solid thermoplastic coating contains a liquid amorphous thermoplastic resin of the rosin acid type esterified with methanol is applied symmetrically to the male and female portion, the change in the thermomechanical behaviour of the lubricating film, namely a greater capacity for flow in the makeup load and temperature range, means that the formation of extrudates and flakes can be considerably limited. At the same time, the supplemented "rheo-resistance" effect provided by the liquid amorphous thermoplastic resin is manifested positively by an increase in the maximum makeup torque (MTV) and negatively by an increase in the shouldering torque. The value of the shouldering torque is slightly more than 70% of the value of the optimum makeup torque and increases with makeup/breakouts. Thus, coating the surfaces which are brought into contact in a symmetrical manner, i.e. all with a solid thermoplastic coating which contains a liquid amorphous thermoplastic resin, is not recommended.

In accordance with the invention, a configuration in which the male and female surfaces which are brought into contact are coated with a solid thermoplastic coating one of which comprises a liquid amorphous thermoplastic resin shows a synergistic effect which is manifested by an improved thermomechanical behaviour and a broadening of the makeup torque window where the inequalities (1), (2) and (3) discussed above are satisfied.

Figure 7:
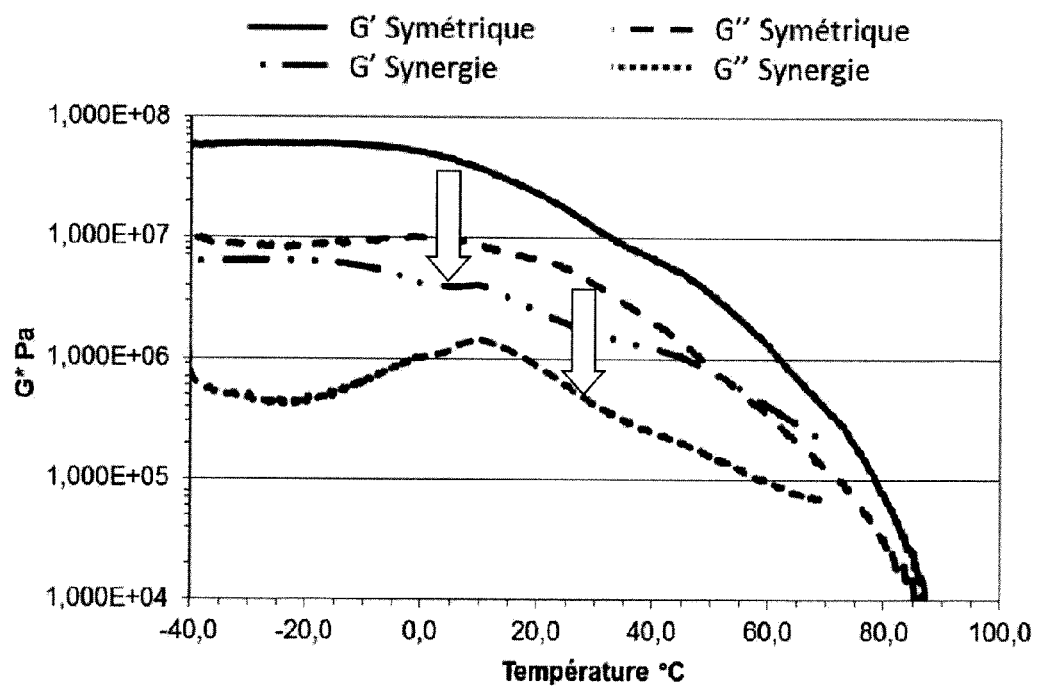

In order to illustrate the favourable thermomechanical behaviour of the third substance, a mixture of equal parts of two coatings with different compositions at least one of which contains a liquid amorphous thermoplastic resin was compared with a reference corresponding to a thermoplastic coating containing a solid "tackifying" resin which was applied symmetrically to the two portions of the connection. FIG. 7 shows that the elastic modulus G' of the mixture (denoted Synergy in FIG. 7) is lower than that of the reference (denoted Symmetrical in FIG. 7). This is the same for the viscous modulus G". The third substance obtained was of a nature to reconcile the thermomechanical properties of each of the coatings with the aim of increasing the overall performance. Smaller moduli and maintaining the ratio between the moduli G2 and G' result in a lower resistance to shear and conservation of the rheo-resistance property.

The Applicant has also carried out a certain number of tests in order to quantify the performances of the association of two solid thermoplastic coatings at least one of which comprises a liquid amorphous thermoplastic resin in accordance with the invention.

In terms of experimental conditions, the thermoplastic coating is formed using a "hot melt" method on the part to be coated, namely the threading zone, the unthreaded metal contact portion and/or the abutment surfaces.

According to the "hot melt" method, the composition comprising a thermoplastic matrix, additives and powders is melted to provide a sufficiently low viscosity for the coating to be capable of being applied by pneumatic spraying using a gun with the capacity to maintain a fixed temperature close to the temperature at which the composition is in the molten state. The temperature to which the composition is heated is preferably in the range 10° C. to 50° C. above the melting point of the thermoplastic matrix. Advantageously, the temperature will be in the range 130° C. to 160° C. such that the complex viscosity under shear (measured using a plane/ plane rheometer) is less than 20 Pa·s. The substrate to be coated is preferably pre-heated to a temperature greater than or equal to the temperature of the molten composition in order to facilitate wetting and spreading.

The composition, heated and melted in a reservoir equipped with mechanical agitation means, is sent to a gun by means of a pump and sprayed onto the substrate.

The substrate is then cooled with air or $CO_2$ in order to solidify the thermoplastic matrix and form the solid thermoplastic lubricating film.

The thickness of the lubricating film formed is preferably in the range 25 to 100 µm. If it were thinner, it would not be thick enough to provide the anti-galling property as well as the corrosion resistance. A thickness above this range generates natural extrusion of the excess and a supplemental risk of environmental pollution.

Figure 9:
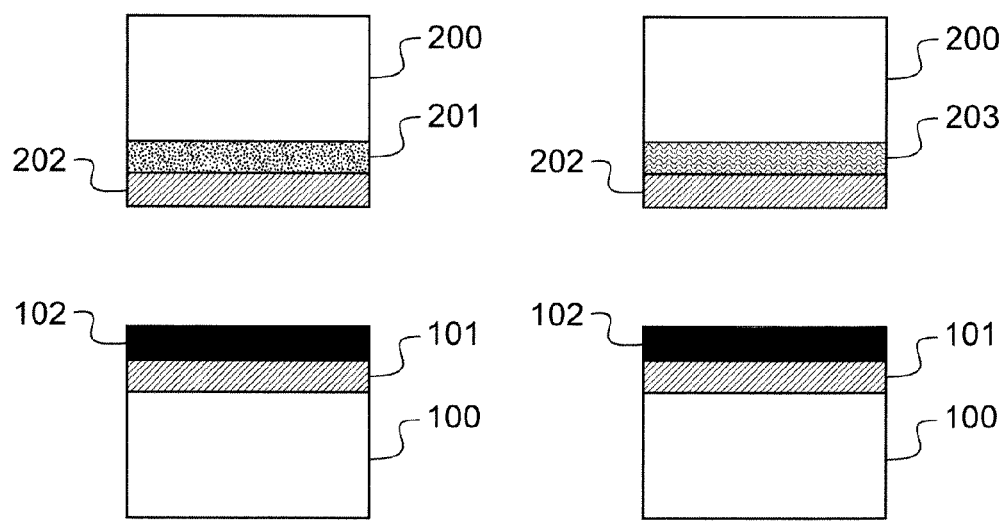
FIG. 9 is a diagrammatic view of a connection configuration.

Alternatively, the composition may be dissolved in an organic solvent with a boiling point of more than 150° C. for direct application to a cold substrate without passing through a step for melting the thermoplastic matrix. The solid thermoplastic lubricating film is then preferably applied to a rough surface. FIG. 9 diagrammatically shows a configuration of the connection comprising a substrate 100 or 200, a surface preparation 101, 201, 203 and the solid thermoplastic lubricating film 102 or 202. A rough surface increases the contact surface area and as a result increases the adhesion and the lubricant retention capacity in particular in the limiting lubrication phase. The roughness of the surface may be obtained by mechanical sand blasting of the steel or by means of a surface preparation using chemical conversion, such as zinc or manganese phosphatation.

Preferably, the mean roughness, Ra, is in the range 1 to 3.5 µm, and the maximum peak height or Rmax is in the range 5 to 25 µm.

The thickness of the film formed must be at least greater than the maximum peak height or Rmax.

The substrate may be formed from carbon steel or a stainless steel with at least 13% Cr. In order to increase the galling resistance of the steel and especially of stainless steel with at least 13% Cr, an electrolytic deposit of copper or, preferably, a Cu—Sn—Zn ternary alloy may be deposited on a layer of Ni at the surface of the substrate. An electrolytic Cu—Sn—Zn deposit increases the hardness and ensures supplemental separation of the male and female surfaces in the contact zone in order to prevent galling.

Advantageously, at least one of the two surfaces in contact undergoes mechanical sand blasting (203) with a maximum depth in the range 10 to 25 µm.

Firstly, the Applicant demonstrated the effects of the present invention by employing it with various types of connections (denoted Example 1 to Example 2) and by comparing these variations with connections coated with conventional films (denoted comparative examples 1 to 6).

The grade and the dimensions of the carbon steel connection and the detail of the male and female surface preparations are shown in Table 1.

TABLE 1

| Examples | Connection | Surface preparation | |
|---|---|---|---|
| | | Male portion | Female portion |
| Example n°1 | 7" 29# L80 VAM TOP | Zinc phosphatation (Rmax = 5 µm) | Manganese phosphatation (Rmax = 11 µm) |
| Example n°2 | 9"⅝ 47# L80 VAM TOP | Zinc phosphatation (Rmax = 5 µm) | Cu—Sn—Zn electrolytic deposit + Ni layer (Th = 12 µm) |
| Comparative example No. 1 | 7" 23# L80 VAM 21 | Zinc phosphatation (Rmax = 5 µm) | Manganese phosphatation (Rmax = 11 µm) |
| Comparative example No. 2 | 7" 29# L80 VAM TOP | Zinc phosphatation (Rmax = 5 µm) | Manganese phosphatation (Rmax = 11 µm) |
| Comparative example No. 3 | 9"⅝ 47# L80 VAM TOP | Zinc phosphatation (Rmax = 5 µm) | Cu—Sn—Zn electrolytic deposit + Ni layer (Th = 12 µm) |
| Comparative example No. 4 | 7" 23# L80 VAM 21 | Zinc phosphatation (Rmax = 5 µm) | Manganese phosphatation (Rmax = 11 µm) |
| Comparative example No. 5 | 7" 23# L80 VAM 21 | Zinc phosphatation (Rmax = 5 µm) | Manganese phosphatation (Rmax = 11 µm) |
| Comparative example No. 6 | 7" 23# L80 VAM 21 | Zinc phosphatation (Rmax = 5 µm) | Cu—Sn—Zn electrolytic deposit + Ni layer (Th = 12 µm) | where: Rmax: maximum peak height, and Th: thickness of layer

The composition of the lubricating films is shown in Table 2 for each example and each comparative example. The percentages are with respect to the total composition weight.

In order to illustrate the effects of the present invention, in particular broadening of the torque window, the Applicant determined the maximum torque on shoulder resistance prior to plastification (or overtorque). In order to illustrate the effects of the present invention on the galling resistance, the Applicant determined the number of makeup/breakout operations carried out at the makeup torque of the connection and the mean shouldering torque value. The results are shown in Table 3.

In each test, makeup was carried out with tongs in the vertical position with a weight of 420 kg. The makeups were carried out 10 times and a makeup was carried out at a speed of 10 and 15 turns per minute at the start of makeup and at a speed of 1 and 2 turns per minute at the end of makeup in the abutment zone. After breakout, the state of galling of the male and female portions was inspected visually. The presence of flakes or extrusion, corresponding to a weak capacity of the third substance to re-agglomerate in the contact, was synonymous with inappropriate thermomechanical behaviour.

EXAMPLE NO. 1

A solid thermoplastic coating with a thermoplastic matrix which did not contain a liquid amorphous thermoplastic resin, but rather a solid "tackifying" resin with a softening point in the range 60° C. to 200° C. was applied to the female portion and a solid thermoplastic coating the matrix of which comprised a liquid amorphous thermoplastic resin was applied to the male portion of a 7" 29# L80 VAM TOP connection. The optimum makeup torque was 17750 N.m. An increase of 80% in the torque window was measured, with no effects on the shouldering torque compared with comparative example No. 2. No extrusion or formation of flakes indicated that there was a synergistic effect in the re-agglomerating thermomechanical behaviour of the third substance. No severe galling was observed after 10 makeup/breakout operations.

EXAMPLE NO. 2

A solid thermoplastic coating with a thermoplastic matrix which did not contain a liquid amorphous thermoplastic resin, but rather a solid "tackifying" resin with a softening point in the range 60° C. to 200° C. was applied to the female portion and a solid thermoplastic coating the matrix of which comprised a liquid amorphous thermoplastic resin was applied to the male portion of a 9⅝" 47# L80 VAM TOP connection. The optimum makeup torque was 19200 N.m. An increase of 13% in the torque window and a significant increase in the torque on shoulder resistance of 60% confirmed the synergistic effect. An overall increase in protection against galling was also visible. No galling was observed after 10 makeup/breakout operations.

COMPARATIVE EXAMPLE NO. 1

A Bestolife 4010NM viscous grease containing no heavy metals which are dangerous to the environment, such as lead, was applied to the male portion and the female portion of a 7" 23# L80 VAM 21 connection in order to form a lubricating film. The quantity of grease applied to the surfaces in contact was 50 g. The maximum torque on shoulder resistance before plastification determined by the overtorquing test for high machining interferences (HH-PFBS) was 13950 N.m. The torque on shoulder resistance for each example was compared with this reference value of 100. The makeup/breakouts were concatenated, renewing the grease between each makeup and were carried out to the optimum makeup torque, namely 16400 N.m. No galling was observed after 10 makeup/breakout operations on the connection.

COMPARATIVE EXAMPLE NO. 2

A solid thermoplastic coating with a thermoplastic matrix which did not contain a liquid amorphous thermoplastic resin, but rather a solid "tackifying" resin with a softening point in the range 60° C. to 200° C. was applied to the male and female portions of a 7" 29# L80 VAM TOP connection. The optimum makeup torque was 16000 N.m. In order to evaluate the capacity of the lubricating film to protect the substrate or the surface preparation against corrosion, the thermoplastic coating was applied to specimens (100 mm×150 mm×0.8 mm) formed from carbon steel with the same surface preparation. The specimens underwent a saline mist test (in accordance with ISO standard 9227, temperature 35° C. for 500 hours), a condensation-water atmosphere test (in accordance with ISO standard 6270, temperature 40° C., relative humidity 95% for 1000 hours) and an accelerated climate or cyclic corrosion test representative of extreme storage conditions (in accordance with VDA standard 621-415, for 3 cycles). No rust was observed at the end of the three tests.

COMPARATIVE EXAMPLE NO. 3

A solid thermoplastic coating with a thermoplastic matrix which did not contain a liquid amorphous thermoplastic resin, but rather a solid "tackifying" resin with a softening point in the range 60° C. to 200° C. was applied to the female portion and an epoxy-acrylic resin cured with ultraviolet light comprising a polyethylene wax and a corrosion inhibitor of the aluminium polyphosphate type was applied to the male portion of a 9⅝" 47# L80 VAM TOP connection. The optimum makeup torque was 18900 N.m. No rust was observed at the end of the three tests, namely saline mist, condensation-water atmosphere and cyclic corrosion.

COMPARATIVE EXAMPLE NO. 4

A solid thermoplastic coating with a thermoplastic matrix which did not contain a liquid amorphous thermoplastic resin, but rather a solid "tackifying" resin with a softening point in the range 60° C. to 200° C. was applied to the male and female portions of a 7" 23# L80 VAM 21 connection. The optimum makeup torque was 17500 N.m. Severe galling in the threading was recorded at the $10^{th}$ makeup/breakout operation. The abutment surfaces were intact. In order to determine the seal of the unthreaded metal contact portion of a connection under well conditions, a high temperature (180° C.) sealing test under external pressure was carried out in accordance with the procedure in ISO standard 13679: 2011. No leakage was observed at the end of the test for comparative example No. 2.

COMPARATIVE EXAMPLE NO. 5

A solid thermoplastic coating with a thermoplastic matrix which contained a liquid amorphous thermoplastic resin was applied to the male and female portions of a 7" 23# L80 VAM 21 connection. The optimum makeup torque was 17500 N.m. The value for the shouldering torque was 70% higher than the value for the optimum torque from the $6^{th}$ makeup/breakout operation. Severe galling in the threading was detected at the $9^{th}$ makeup/breakout operation, but the abutment surfaces were intact. However, makeup was stopped because the mechanical properties of the connection were no longer guaranteed. The lubricating film completely protected the surface preparation because no rust had appeared at the end of the three tests, the saline mist, condensation-water atmosphere and cyclic corrosion tests.

COMPARATIVE EXAMPLE NO. 6

A solid thermoplastic coating the matrix of which was completely crystalline was applied to the female portion and an epoxy-acrylic resin cured by ultraviolet light comprising a polyethylene wax and an aluminium polyphosphate type corrosion inhibitor was applied to the male portion of a 7" 23# L80 VAM 21 connection. The optimum makeup torque was 10800 N.m. No galling was observed after 10 makeup/breakout operations of the connection. In contrast, the maximum makeup torque was much lower than the optimum makeup torque with API5A3 reference grease for a "High Torque" connection with the same dimensions. The unthreaded metal contact portion was at risk of being plasticized before reaching the optimum makeup torque. In this case, such a lubricating solution could not be extended to all grades of the connections.

TABLE 2

| | | Composition of lubricating film (% by weight) | | | | | |
|---|---|---|---|---|---|---|---|
| Examples | | Composition of thermoplastic matrix | | | Corrosion inhibitor | Friction modifier | Solid lubricants |
| 1 and 2 | Male portion | Copolyamide (22) | Rosin ester viscous liquid (40) | Waxes (13) | Calcium ion-exchanged silica (10) | Silicone oil (5) | $Bi_2S_3$ (8) PTFE (2) |

TABLE 2-continued

Composition of lubricating film (% by weight)

| Examples | Composition of thermoplastic matrix | | | Corrosion inhibitor | Friction modifier | Solid lubricants |
|---|---|---|---|---|---|---|
| Female portion | EVA (17.5) | Rosin ester (30) | Waxes (17.5) | Calcium ion-exchanged silica (10) | Silicone oil (5) | $Bi_2S_3$ (16) PTFE (4) |
| Comparative example No. 1 | | Bestolife 4010NM grease (containing a calcium and graphite metallic soap) | | | | |
| Comparative example No. 2, 3 and 4 | EVA (17.5) | Rosin ester (30) | Waxes (17.5) | Calcium ion-exchanged silica (10) | Silicone oil (5) | $Bi_2S_3$ (16) PTFE (4) |
| Comparative example No. 5 | Copolyamide (22) | Rosin ester viscous liquid (40) | Waxes (13) | Calcium ion-exchanged silica (10) | Silicone oil (5) | $Bi_2S_3$ (8) PTFE (2) |
| Comparative example No. 6 | Polyethylene wax (10) Carnauba wax (15) | Zn stearate (15) | Poly-alkylmethacrylate (5) | Oxide wax - Ca soap (40) | ZnO, $TiO_2$, $Bi_2O_3$ (11) | Carbon fluoride (4) |

TABLE 3

| Example | Number of makeup/breakout operations (1 → 10) | | | | | | | | | | Torque on shoulder resistance (N · m) | ShT (%) | ΔT (%) | Extrusion, flakes |
|---|---|---|---|---|---|---|---|---|---|---|---|---|---|---|
| Example n°1 | ○ | ○ | ○ | ○ | ○ | ○ | ○ | ○ | ○ | Δ | 18825 | 43 | 105 | No |
| Example n°2 | ○ | ○ | ○ | ○ | ○ | ○ | ○ | ○ | ○ | ○ | 20670 | 46 | 128 | No |
| Comparative example No. 1 | ○ | ○ | ○ | ○ | ○ | Δ | Δ | Δ | Δ | Δ | 11300 | 43 | 100 | No |
| Comparative example No. 2 | ○ | ○ | ○ | ○ | ○ | ○ | ○ | Δ | Δ | Δ | 10400 | 39 | 80 | Yes |
| Comparative example No. 3 | ○ | ○ | ○ | ○ | ○ | ○ | ○ | Δ | X | — | 18260 | 50 | 118 | Yes |
| Comparative example No. 4 | ○ | ○ | ○ | ○ | ○ | ○ | ○ | ○ | ○ | X | 15542 | 50 | 107 | Yes |
| Comparative example No. 5 | ○ | ○ | ○ | ○ | ○ | Δ | Δ | X | — | — | 10000 | 71 | 146 | No |
| Comparative example No. 6 | ○ | ○ | ○ | ○ | ○ | ○ | ○ | ○ | ○ | ○ | 10950 | 62 | 61 | No |

○: No galling,
Δ: Appearance of slight galling (allowing a fresh makeup operation to be carried out), \
X: Severe galling,
—: Test terminated
Torque on shoulder resistance: Difference between MTV (LL-PNBN) and ShT (HH-PFBS) expressed in N · m
ΔT (%): Torque on shoulder resistance in HH-PFBS configuration expressed as % of reference grease (comparative example No. 1)
ShT (%): Ratio of shouldering torque to optimum makeup torque in HH-PFBS configuration over total of makeup operations without severe galling

The invention claimed is:

1. An assembly, comprising a first and a second tubular component each with an axis of revolution and each at one of their ends with a threaded zone produced on the outer or inner peripheral surface of the component depending on whether the threaded end is male or female in type, said ends being capable of cooperating by makeup and ending in a terminal surface, a first contact surface being on one of the ends and a second contact surface being on the corresponding end, such that the first and second contact surfaces come into contact during makeup of the ends, wherein the first and second contact surfaces are respectively each coated with a first and a second dry thermoplastic film the matrices of which are constituted by a thermoplastic polymer, only one of the first and second dry thermoplastic films further comprising a liquid amorphous thermoplastic resin with a dynamic viscosity in the range of 2000 to 40000 mPa·s at 25° C.

2. The assembly according to claim 1, wherein the first and second contact surfaces comprise a portion of the threaded zones.

3. The assembly according to claim 1, wherein the first and second contact surfaces comprise sealing surfaces provided on the circumferential surface of the ends of the first and a second tubular components.

4. The assembly according to claim 1, wherein the first and second contact surfaces comprise abutment surfaces provided on the terminal surfaces of said ends.

5. The assembly according to claim 1, wherein the thermoplastic polymer or polymers constituting the matrix of the first and second dry films have a semi-crystalline structure and a melting point in the range of 60° C. to 170° C.

6. The assembly according to claim 1, wherein the liquid amorphous thermoplastic resin included in only one of the first and second dry thermoplastic films has a glass transition temperature of less than −10° C.

7. The assembly according to claim 1, wherein the ratio of the concentrations of the liquid amorphous thermoplastic resin to the polymers is in the range of 1.5 to 2.

8. The assembly according to claim 1, wherein the liquid amorphous thermoplastic resin is selected from the group consisting of rosin acid derivatives esterified with methanol or with triethylene glycol, aromatic hydrocarbon resins with a molecular mass of less than 500 g/mole, hydroxylated polyester resins, polyisobutylenes and polyalkylmethacrylates.

9. The assembly according to claim 1, wherein the dry thermoplastic films further comprise a complex alkylarylsulphonic acid salt neutralized with a calcium carbonate, the proportion by weight remaining below 40%.

10. The assembly according to claim 1, wherein the dry thermoplastic films further comprises a corrosion inhibitor, the proportion by weight of corrosion inhibitor being in the range of 5% to 15% by weight.

11. The assembly according to claim 1, wherein the dry thermoplastic films further comprises a polydimethylsiloxane or perfluoropolyether oil, said oil having a kinematic viscosity in the range of 100 to 1850 $mm^2/s$ at 20° C., the proportion by weight of said oil being in the range of 2% to 10%.

12. The assembly according to claim 1, wherein the first and second contact surfaces have already been treated by means of a surface preparation step selected from the group consisting of sand blasting, conversion treatments and electrolytic deposition, before coating each surface with the dry thermoplastic film.

13. The assembly according to claim 1, wherein the thermoplastic polymer or polymers is or are selected from the group consisting of copolymeric resins comprising ethylene-vinyl acetate copolymers, ethylene-ethyl acrylate copolymers, ethylene-methyl acrylate copolymers, copolymers with alternating blocks of an amorphous butyl acrylate polymer between two crystalline polymethylmethacrylate polymers and copolyamides based on dimers obtained from a polycondensation reaction between a diacid and a diamine.

14. The assembly according to claim 13, wherein the thermoplastic polymer is an ethylene-vinyl acetate copolymer with a proportion of vinyl acetate in the range of 18% to 40%.

15. The assembly according to claim 1, wherein the thermoplastic dry films further comprise at least one wax selected from the group consisting of paraffins, microcrystalline waxes, carnauba waxes, polyethylene waxes, amide waxes and hydrogenated castor oils.

16. The assembly according to claim 15, wherein the proportion by weight of waxes in the thermoplastic dry film is in the range of 3% to 20%.

17. The assembly according to claim 1, wherein the dry thermoplastic films further comprise particles of solid lubricants selected from the group consisting of graphite, boron nitride, zinc oxide, molybdenum disulphide, graphite fluoride, tin sulphides, bismuth sulphides, thiosulfates, polytetrafluorethylene and polyamides.

18. The assembly according to claim 17, wherein the proportion by weight of solid lubricant particles in the dry thermoplastic film is in the range of 2% to 20%.

* * * * *